UNITED STATES PATENT OFFICE.

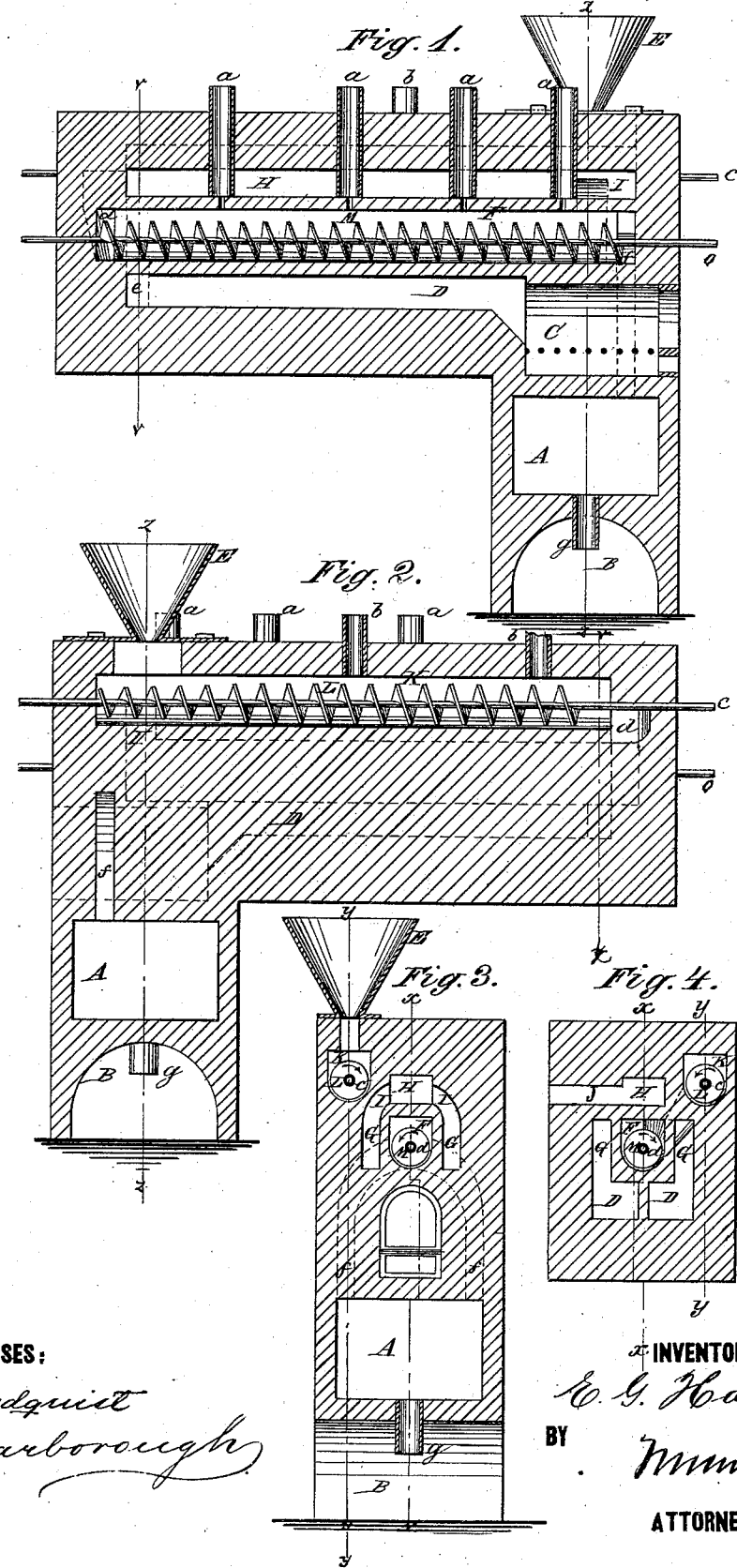

EDWARD G. HALL, OF HEALDSBURG, CALIFORNIA.

IMPROVEMENT IN ORE-ROASTING FURNACES.

Specification forming part of Letters Patent No. 198,016, dated December 11, 1877; application filed December 11, 1876.

*To all whom it may concern:*

Be it known that I, EDWARD G. HALL, of Healdsburg, in the county of Sonoma and State of California, have invented a new and Improved Ore-Roasting Furnace, of which the following is a specification:

Figure 1 is a side elevation in section on line $x$ $x$ in Figs. 3 and 4. Fig. 2 is a side elevation in section on line $y$ $y$ in Figs. 3 and 4. Fig. 3 is a transverse section on line $z$ $z$ in Figs. 1 and 2; and Fig. 4 is a transverse section on line $v$ $v$ in Figs. 1 and 2.

Similar letters of reference indicate corresponding parts.

The invention consists in the improvement of that class of furnaces used for the roasting and reduction of cinnabar ores, as hereinafter described.

Referring to the drawings, A is a chamber for containing roasted ore, and B is an arch upon which it rests. C is the fire-arch of the roasting-furnace, and D D are flues which conduct the products of combustion under the roasting chamber or retort F to the rear end of the furnace, at which point the flues D are connected by passages $e$ with return-flues G, which lead to the front of the furnace along the sides of the roasting-chamber F. The flues G are connected with a central flue, H, by the passages I. The flue H passes over the top of the roasting-chamber F, and discharges through the passage J into the chimney. K is a drying-chamber, the lower side of which is made semicircular in cross-section. L is a screw-conveyer placed in the said drying-chamber, and provided with a hollow shaft, $c$, through which a current of water passes, for the purpose of preventing the conveyer from becoming unduly heated.

The screw of the conveyer L is coned or tapered for a short distance near the front of the furnace, it being smallest at the end and tapering back toward the center.

The chamber K is provided with tubes $b$, for leading the steam and other volatile matter to an exhaust-fan, which forces it into a suitable condenser. A passage, $d$, connects the chamber K and a similar chamber, F, in which the ore is roasted after being dried in the chamber K. M is a conveying-screw placed in the chamber F, and provided with a tubular shaft, $o$, for the passage of a current of water for preventing the screw from becoming unduly heated, as in the case of the screw L. $a$ $a$ are tubes for conveying volatile matter from the chamber F to an exhaust-fan, which drives it into a suitable condensing apparatus. Passages $f$ lead from the chamber F to the chamber A, and a discharge-passage, $g$, is provided, through which the roasted ore is discharged below the arch B.

A fire being in the arch C, and the conveying-screws being connected with a suitable power, by which they are revolved, a current of water is passed through the tubular shafts $c$ $o$, and a quantity of ore, which has been previously broken into small fragments, is placed in the hopper E, from which it passes to the drying-chamber K, and is carried along by the conveyer L to the passage $d$. In its passage to this point it is heated sufficiently to drive off the more volatile matter, which is drawn through the tubes $b$ by an exhaust-fan and delivered to a suitable condenser.

When the ore reaches the passage $d$ it falls into the roasting-chamber F in a suitable state for roasting in the more intense heat of the said chamber. The conveyer M carries the ore forward to the passages $f$, through which it falls into the chamber A. The ore in the roasting-chamber F is subjected to the greatest heat of the fire in the arch C, and consequently parts with its mercury and other vaporable matter, which is drawn through the tubes $a$ by an exhaust-fan and delivered to a condenser.

The quantity of ore carried through the furnace is regulated by sliding the hopper E. If it is placed over the smaller portion of the conveyer L a less quantity is taken away by the screw than when it is placed over the larger portion.

The ore, after being roasted, is removed from the chamber A through the passage $g$.

The hopper, when full of ore, seals the furnace, when moved from the smallest part of the feeding end of screw up the taper a faster feed is produced, and when moved in a reverse direction secures a slower feed, thus saving entirely the labor of one man to each furnace This would be entirely impracticable without the tapered flange on end of feed-screw.

Having thus described my invention, I claim as new and desire to secure by Letters Patent—

1. The combination, in a roasting-furnace, of the sliding hopper E, the screw-conveyer L, with flanges tapered at the feeding end, and the chamber K, having inlet under said hopper, as and for the purpose described.

2. The combination of the discharge-flues f f, the chamber A, located directly beneath the fuel-chamber, and the discharge g, as and for the purpose set forth.

3. The combination, with the fire-chamber C, flues D D, passages e, and return-flues G, of the central flue H, connecting with passages I J, as and for the purpose specified.

EDWARD G. HALL.

Witnesses:
J. W. ROSE,
L. C. SPURR.